(12) United States Patent
Nakano et al.

(10) Patent No.: US 6,493,207 B2
(45) Date of Patent: Dec. 10, 2002

(54) MULTILAYER CERAMIC CAPACITOR

(75) Inventors: Yukie Nakano, Tokyo (JP); Takako Hibi, Tokyo (JP); Mari Miyauchi, Tokyo (JP); Daisuke Iwanaga, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/887,927

(22) Filed: Jun. 26, 2001

(65) Prior Publication Data

US 2001/0055192 A1 Dec. 27, 2001

Related U.S. Application Data

(63) Continuation of application No. PCT/JP00/07496, filed on Oct. 26, 2000.

(30) Foreign Application Priority Data

Nov. 2, 1999 (JP) .......................................... 11-349265

(51) Int. Cl.$^7$ .............................................. H01G 4/228
(52) U.S. Cl. ................. 361/306.3; 361/311; 361/321.1; 361/308; 361/310
(58) Field of Search .......................... 361/306.3, 306.1, 361/321, 328, 525, 528, 502, 321.5, 321.4, 321.1, 311, 308, 310

(56) References Cited

U.S. PATENT DOCUMENTS

| | | | |
|---|---|---|---|
| 5,144,527 A | * | 9/1992 | Amano et al. |
| 5,646,815 A | * | 7/1997 | Owens et al. |
| 5,774,326 A | * | 6/1998 | McConnelee et al. |
| 6,078,494 A | * | 6/2000 | Hansen |
| 6,160,472 A | * | 12/2000 | Arashi et al. |

FOREIGN PATENT DOCUMENTS

| | | |
|---|---|---|
| JP | 60-81706 A | 5/1985 |
| JP | 64-80007 A | 3/1989 |
| JP | 02-94618 A | 4/1990 |
| JP | 05-275271 A | 10/1993 |
| JP | 06-176954 A | 6/1994 |
| JP | 06-215980 A | 8/1994 |
| JP | 06-349314 A | 12/1994 |
| JP | 08-246010 A | 9/1996 |
| JP | 11-31634 A | 2/1999 |

OTHER PUBLICATIONS

The 9$^{th}$ US–Japan Seminar on Dielectric & Piezoelectric Ceramics, Publication Date: Nov. 4, 1999; *Effect of Multiplication on Residual Stress and Reliability of MLCCs with NI–electrode.*

* cited by examiner

*Primary Examiner*—Chau N. Nguyen
*Assistant Examiner*—Nguyen Ha
(74) *Attorney, Agent, or Firm*—Oliff & Berridge, PLC

(57) ABSTRACT

The invention provides a multilayer ceramic capacitor capable of preventing the occurrence of cracks by inhibiting the multilayer capacitor from expanding in a stacking direction and a width direction. The multilayer ceramic capacitor includes a capacitor element (10) in which dielectric layers (11a and 11b) and internal electrodes (12) are alternately stacked. The capacitor element (10) is obtained by stacking and firing a dielectric paste layer and an internal electrode paste layer. An expansion coefficient x in the stacking direction lies between −0.05i% and 0.05i% inclusive, where i denotes the number of dielectric layers (11a), preferably the expansion coefficient x is 0% or less, or more preferably the expansion coefficient x lies between −10% and 0% inclusive. Preferably, an expansion coefficient y in the width direction lies between −0.05i% and 0% inclusive. The expansion coefficients x and y can be controlled by adding a carbon material or a lithium-containing compound to the internal electrode paste layer, or by reducing a thickness of the dielectric layer (11b) located in an outermost portion. Thus, the occurrence of cracks is inhibited, and therefore a fraction defective is reduced.

14 Claims, 4 Drawing Sheets

MULTILAYER CERAMIC CAPACITOR

This is a Continuation of Application No. PCT/JP00/07496 filed Oct. 26, 2000. The entire disclosure of the prior application is hereby incorporated by reference herein in its entirety.

TECHNICAL FIELD

The invention relates to a multilayer capacitor having a capacitor element in which dielectric layers and internal electrodes are alternately stacked and more particularly to a shape of a capacitor element.

BACKGROUND ART

Recently, electronic equipment has rapidly advanced in size reduction because of sophistication of ICs (integrated circuits), LSIs (large scale integrated circuits) and so on. With the advance in size reduction, a capacitor that is an electronic component is also advancing in size reduction, and thus a demand for a multilayer capacitor is growing sharply. For example, known is a multilayer capacitor comprising a capacitor element in which dielectric layers and internal electrodes are alternately stacked and also having terminal electrodes formed in the capacitor element. The capacitor element is generally formed in the following manner using a dielectric paste containing a dielectric material blended with an organic vehicle and an internal electrode paste containing a conductive material blended with an organic vehicle: that is, the dielectric paste and the internal electrode paste are alternately stacked, then the stacked pastes are integrated by applying pressure to the pastes, and finally the integrated pastes are fired.

In the case of the above-mentioned capacitor element, the internal electrode has to be made of a material that does not react with a material of the dielectric layer even if the internal electrodes are fired simultaneously with the dielectric layers, because the internal electrodes integrated with the dielectric layers are fired simultaneously. Therefore, a noble metal such as platinum (Pt) or palladium (Pd) has been heretofore used as the internal electrode. However, the noble metal is expensive and results in a rise in the price of the multilayer capacitor. Therefore, studies are conducted for the purpose of using an inexpensive base metal as the internal electrode, so that a dielectric capable of being fired in a reducing atmosphere in which nickel (Ni) does not oxidize is developed, thereby making it possible to use nickel as the internal electrode and thus achieving a substantial reduction in cost.

When nickel is used as the internal electrode, the internal electrode is, however, prone to break because the internal electrode becomes spherical and thick as sintering proceeds. Thus, a problem exists: that is, the multilayer capacitor expands in a stacking direction and a width direction, so that cracks occur in the multilayer capacitor. This problem becomes more noticeable as the number of dielectric layers increases, and the problem has been serious particularly in recent years in which, to meet demands for a smaller size and a larger capacity, the dielectric layer has become thinner and increased in number and therefore the number of dielectric layers has increased.

As the related art pertaining to the internal electrode paste, addition of a carbon compound is described in, for example, Japanese Patent Application Publication No. Hei 2-94618, but the addition of the carbon compound takes place in order to inhibit oxidation of the internal electrode, and this publication gives no description about the correlation between the addition of the carbon compound and the occurrence of expansion and cracks of the multilayer capacitor.

The invention is designed to overcome the foregoing problem. It is an object of the invention to provide a multilayer capacitor capable of preventing the occurrence of cracks by inhibiting the multilayer capacitor from expanding in the stacking direction or the width direction.

DISCLOSURE OF THE INVENTION

There is provided a multilayer capacitor of the invention comprising a capacitor element in which dielectric layers and internal electrodes are alternately stacked, wherein an expansion coefficient x of the capacitor element in a stacking direction lies between $-0.05 \times i$ (%) and $0.05 \times i$ (%) inclusive, where i denotes the number of dielectric layers, each of which is sandwiched between the internal electrodes.

There is provided another multilayer capacitor of the invention including a capacitor element in which dielectric layers and internal electrodes are alternately stacked, wherein the expansion coefficient x of the capacitor element in the stacking direction lies between $-0.10$ (%) and $0$ (%) inclusive.

In the above-described multilayer capacitors of the invention, the expansion coefficient x of the capacitor element in the stacking direction falls within a predetermined range, so that the occurrence of cracks is prevented, and therefore a fraction defective is reduced.

Preferably, in the multilayer capacitor of the invention, the expansion coefficient x lies between $-0.05 \times i$ (%) and $0$ (%) inclusive. Preferably, in the above-described multilayer capacitors of the invention, the capacitor element has the dielectric layer in an outermost portion in the stacking direction, and the dielectric layer located in the outermost portion has a thickness of 100 $\mu$m or less. In the above-described multilayer capacitors, the internal electrode may include nickel.

The capacitor element is obtained by stacking and firing a dielectric paste layer containing a dielectric material and an internal electrode paste layer containing a conductive material, and the internal electrode paste layer may comprise at least one of a carbon compound and a lithium-containing compound. Preferably, the internal electrode paste layer contains the carbon compound in such a manner that the content of carbon lies between 0.5 and 16 parts by weight inclusive to 100 parts by weight of a metallic element in the conductive material. Preferably, the internal electrode paste layer contains the lithium-containing compound in such a manner that the content of lithium (Li) lies between 0.005 and 10 parts by weight inclusive to 100 parts by weight of the metallic element in the conductive material. Preferably, the lithium-containing compound is lithium-containing salt.

There is provided still another multilayer capacitor of the invention comprising a capacitor element in which dielectric layers and internal electrodes are alternately stacked, wherein an expansion coefficient y of the capacitor element in a width direction lies between $-0.05 \times i$ (%) and $0$ (%) inclusive, where i denotes the number of dielectric layers, each of which is sandwiched between the internal electrodes.

In the above-mentioned multilayer capacitor of the invention, the expansion coefficient y of the capacitor element in the width direction falls within a predetermined range, so that the occurrence of cracks is prevented, and therefore the fraction defective is reduced. In the multilayer capacitor, the internal electrode may include nickel.

The capacitor element is obtained by stacking and firing a dielectric paste layer containing a dielectric material and an internal electrode paste layer containing a conductive material, and the internal electrode paste layer may contain a lithium-containing compound. Preferably, the internal electrode paste layer contains the lithium-containing compound in such a manner that the content of lithium lies between 0.005 and 10 parts by weight inclusive to 100 parts by weight of the metallic element in the conductive material. Preferably, the lithium-containing compound is lithium-containing salt.

Other and further objects, features and advantages of the invention will appear more fully from the following description.

BEST MODE FOR CARRYING OUT THE INVENTION

An embodiment of the invention will be described in detail below with reference to the drawings.

Figure 1:
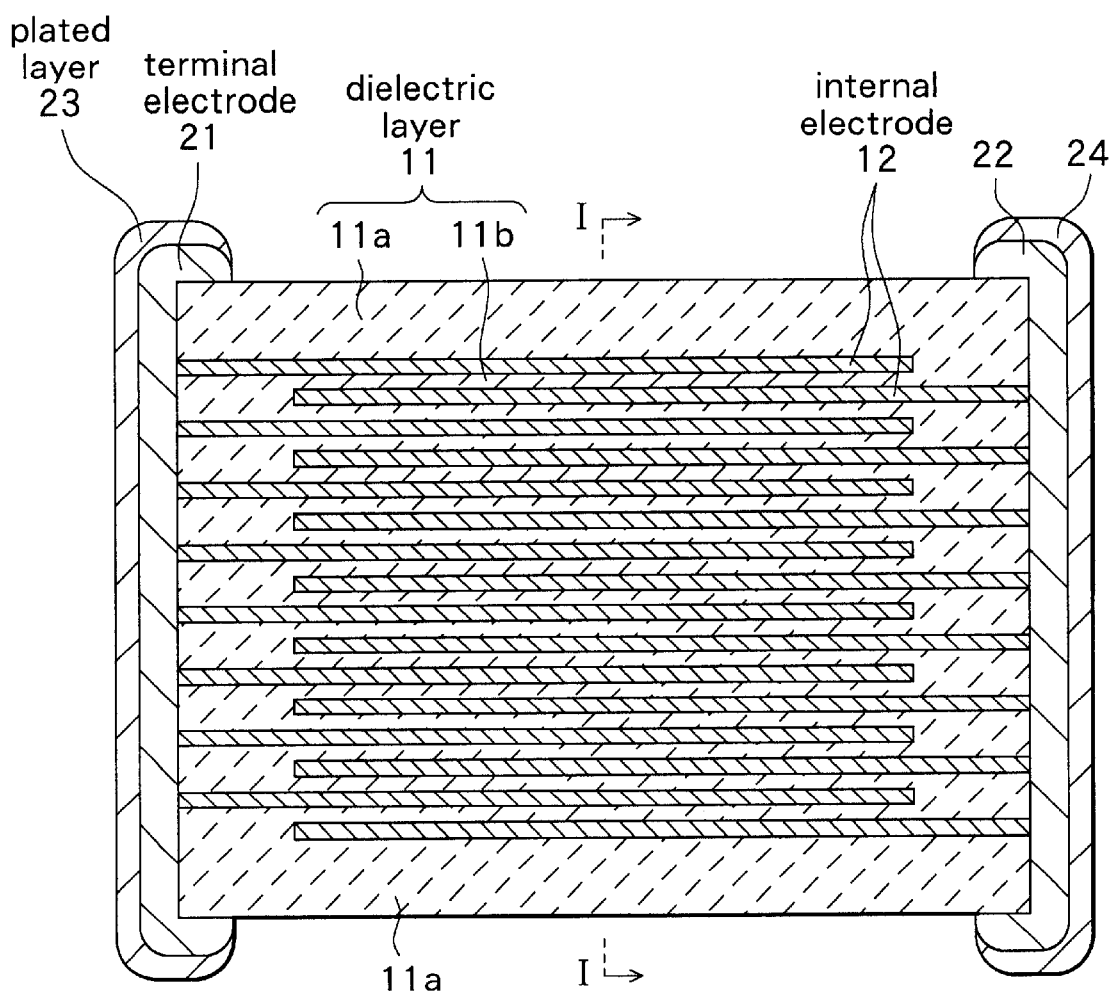
FIG. 1 is a sectional view of a structure of a multilayer capacitor according to one embodiment of the invention.
Figure 2:
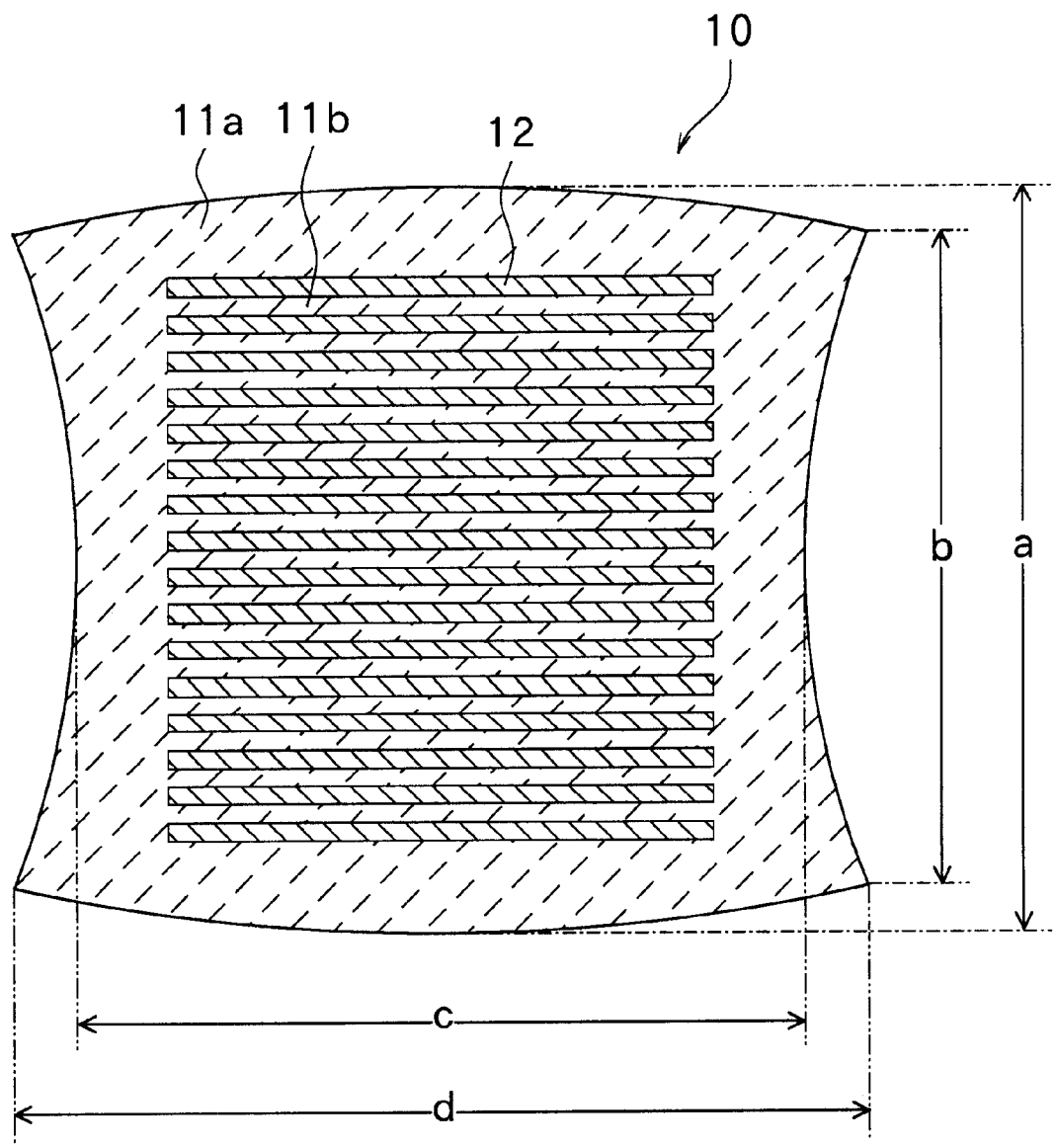
FIG. 2 is a sectional view for describing an expansion coefficient x of the multilayer capacitor shown in FIG. 1 in a stacking direction.

FIG. 1 shows a sectional structure of a multilayer capacitor according to one embodiment of the invention, and FIG. 2 shows a sectional structure taken along the line I—I of FIG. 1. The multilayer capacitor comprises a capacitor element 10 having a plurality of dielectric layers 11a and 11b alternately stacked a plurality of internal electrodes 12. The capacitor element 10 is formed of the dielectric layer 11a in the outermost portion thereof in the stacking direction thereof. The dielectric layer 11a located in the outermost portion functions as a non-effective layer that does not exhibit dielectric polarization, and the dielectric layer 11b sandwiched between the internal electrodes 12 functions as an effective layer that exhibits dielectric polarization. For example, the internal electrodes 12 extend alternately in opposite directions, and a pair of terminal electrodes 21 and 22 electrically connected to the internal electrodes 12 is provided in the directions in which the internal electrodes 12 extend. Plated layers 23 and 24 are provided on the outsides of the terminal electrodes 21 and 22, respectively.

The capacitor element 10 has a substantially hexahedral shape, and, in some cases, its surface situated in the stacking direction may expand or shrink and thus curve in the stacking direction. Preferably, an expansion coefficient x in the stacking direction lies between $-0.05 \times i$ (%) and $0.05 \times i$ (%) inclusive, assuming that the number of dielectric layers 11b is i, because the occurrence of cracks can be inhibited effectively.

The expansion coefficient x is expressed by the following equation:

$$x = \{(a-b)/b\} \times 100$$

where, as shown in FIG. 2, a denotes a maximum or minimum length of a central or nearly central portion of a surface that is perpendicular to the directions in which the internal electrodes 12 extend, in the stacking direction, and b denotes a length of an end portion of the surface in the stacking direction. In other words, the central or nearly central portion expands and curves in the stacking direction when the expansion coefficient x takes on a positive value, and the central or nearly central portion shrinks and curves in the stacking direction when the expansion coefficient x takes on a negative value. Incidentally, FIG. 2 shows a conceptual representation exaggerated in order to describe the expansion coefficient x and an expansion coefficient y to be described later, and thus FIG. 2 does not show an actual stacked state of the internal electrodes 12.

More preferably, the expansion coefficient x lies between $-0.05i$ % and 0% inclusive, or still more preferably, the expansion coefficient x falls within a range of not less than $-0.05i$ % to less than 0%, because the occurrence of corner crack can be more effectively inhibited when the expansion coefficient x is equal to or less than 0% or is less than 0%. Alternatively, the expansion coefficient x may lie between $-10$% and 0% inclusive or fall within a range of not less than $-10$% to less than 0%, because the occurrence of corner crack can be more effectively inhibited when the expansion coefficient x is equal to or less than 0% or is less than 0%, and the occurrence of cracks due to delamination increases when the expansion coefficient x is less than $-10$%. This is effective, particularly when the number i of dielectric layers 11b is large, for example, when the number i is equal to or larger than 200. Corner crack refers to structural defects (cracks) that appear at corners of the dielectric layers 11a, and delamination refers to that the dielectric layers 11a and 11b delaminate from the internal electrodes 12 and thus cracks are produced between the dielectric layers 11a and 11b and the internal electrodes 12.

In some cases, a surface of the capacitor element 10, specifically, a surface that is situated in the direction perpendicular to the directions in which the internal electrodes 12 extend and the stacking direction, may shrink and curve in a width direction. Preferably, the expansion coefficient y in the width direction lies between $-0.05 \times i$ (%) and 0 (%) inclusive, assuming that the number of dielectric layers 11b is i, because the occurrence of cracks can be effectively inhibited similarly to the expansion coefficient x.

The width direction refers to the direction perpendicular to the directions in which the internal electrodes 12 extend and the stacking direction. The expansion coefficient y is expressed by the following equation:

$$y = \{(c-d)/d\} \times 100$$

where, as shown in FIG. 2, c denotes a minimum or maximum length of the central or nearly central portion of the surface that is perpendicular to the directions in which the internal electrodes 12 extend, in the width direction, and d denotes a length of the end portion of the surface in the width direction. In other words, as in the case of the expansion coefficient x, the central or nearly central portion shrinks and curves in the width direction when the expansion coefficient y takes on a negative value, and the central or nearly central portion expands and curves in the width direction when the expansion coefficient y takes on a positive value.

A thickness of one each of the dielectric layers 11a of the capacitor element 10 is not particularly limited, and the thickness is about 5 μm to 300 μm, for example. Preferably, the dielectric layer 11a is thinner because the thinner dielectric layer 11a can more effectively inhibit the occurrence of cracks, and, for example, the dielectric layer 11a has a thickness of 100 μm or less, or more preferably, the dielectric layer 11a has a thickness of 50 μm or less. A thickness of one each of the dielectric layers 11b is not particularly limited, and the thickness is about 0.5 μm to 20 μm, for example. A thickness of one each of the internal electrodes 12 is appropriately determined according to applications, and the thickness is about 0.2 μm to 5 μm, for example. Preferably, the number i of dielectric layers 11a is greater because the greater number of dielectric layers 11a achieves more effect of the invention, and specifically, the number i of dielectric layers 11a is equal to or greater than 100, or more preferably, the number i of dielectric layers 11a is equal to or greater than 200.

The capacitor element 10 is obtained by, for example, stacking dielectric paste layers and internal electrode paste layers and then firing the stacked layers. The dielectric paste layer contains a dielectric material and an organic vehicle, for example. Powders are used as the dielectric material according to the composition of the dielectric layers 11a and 11b. A material of the dielectric material is not particularly limited, various dielectric materials are used, and preferably, titanium oxide ($TiO_2$), titanate composite oxide, a mixture of these materials, or the like, for example, is used.

For example, titanate composite oxides include barium titanate (BaTiO3) and barium titanate zirconate (Ba(Ti, Zr)$O_3$). Desirably, the atomic ratio Ba/Ti of barium (Ba) to titanium (Ti) is about 0.95 to 1.20. For example, when barium titanate is used, a secondary component material such as magnesium oxide, calcium oxide (CaO), manganese oxide ($Mn_3O_4$), yttrium oxide ($Y_2O_3$), vanadium oxide ($V_2O_5$), zinc oxide (ZnO), zirconium oxide ($ZrO_2$), niobium oxide ($Nb_2O_5$), chromium oxide ($Cr_2O_3$), iron oxide ($Fe_2O_3$), phosphorus oxide ($P_2O_5$), sodium oxide ($Na_2O$) or potassium oxide ($K_2O$) may be added to barium titanate as needed, and the percentage of content of this additive is about 0.001 wt. % to 30 wt. % in total.

An average particle diameter of the dielectric material is determined according to an intended average grain size diameter of each of the dielectric layers 11a and 11b, and, in general, preferably, the average particle diameter of the dielectric material is about 0.05 μm to 2.0 μm.

The organic vehicle contained in the dielectric paste layer is made of, for example, a binder dissolved in an organic solvent. The binder to be used is not particularly limited but is appropriately selected among various types of general binders such as ethyl cellulose. The organic solvent to be used is not particularly limited but is appropriately selected among various types of organic solvents such as terpineol, butyl carbitol, acetone and toluene according to a manufacturing method such as print method or sheet method. A glass component may be added to the dielectric paste in order to control a firing temperature and a coefficient of linear expansion.

The internal electrode paste layer contains a conductive material and an organic vehicle, for example. Although the conductive material is not particularly limited, nickel, copper or an alloy of nickel and copper is preferable because the internal electrodes 12 may be made of an inexpensive base metal when a material having reduction resistance is used as a material of the dielectric layers 11a and 11b. The conductive material may contain various types of trace components such as phosphorus (P), magnesium (Mg), aluminum (Al), iron (Fe) and cobalt (Co), and the percentage of content of the trace components is about 0.1 wt. % or lower, or the conductive material may contain a material having the same composition as the composition of the dielectric layers 11a and 11b, or a component in the composition of the dielectric. Besides the above-mentioned metals or alloy, various types of oxides, an organometallic compound, resinate or the like to be fired into the metals or alloy may be used as the conductive material.

That is, preferably, the internal electrode 12 contains, for example, nickel or copper, or more preferably, the internal electrode 12 contains nickel. For instance, the same organic vehicle as the organic vehicle contained in the dielectric paste layer is used as the organic vehicle contained in the internal electrode paste layer.

Preferably, the internal electrode paste layer comprises at least one of a carbon compound and a lithium-containing compound. Since the carbon compound and the lithium-containing compound evaporate (vaporize) at lower temperature than a firing temperature for forming the capacitor element 10, it is possible that most of the carbon compound or the lithium-containing compound evaporates outward from the internal electrode paste layer during firing and this evaporation promotes shrinkage of the internal electrodes 12 and thus allows inhibiting the internal electrodes 12 from growing thick and breaking. That is, thus, the embodiment permits the expansion coefficient x of the capacitor element 10 in the stacking direction or the expansion coefficient y of the capacitor element 10 in the width direction to fall within a predetermined range. To control the expansion coefficient y of the capacitor element 10 in the width direction, the lithium-containing compound is preferable to the carbon compound because the lithium-containing compound can achieve more effect.

Carbon compounds also include a material made of only carbon, for example, carbon black, graphite and so on. Preferably, the content of the carbon compound in the internal electrode paste layer is set so that the content of carbon in the carbon compound lies between 0.5 and 16 parts by weight inclusive to 100 parts by weight of a metallic element in the conductive material. When the carbon content is lower than this range, the effect of addition of the carbon compound can be hardly achieved, so that the capacitor element 10 expands greatly in the stacking direction. When the carbon content is higher than this range, vacancies appear in the internal electrodes 12, and extremely great variations in the degree of shrinkage occur between the internal electrodes 12 and the dielectric layers 11a and 11b, so that the number of cracks increases. More preferably, the content of the carbon compound is set so that the content of carbon in the carbon compound lies between 2 and 12 parts by weight inclusive to 100 parts by weight of the metallic element in the conductive material, or still more preferably, 4 and 10 parts by weight inclusive.

Lithium-containing compounds include lithium, a lithium alloy, lithium oxide, lithium-containing salt, a lithium-containing organometallic compound and so on. For example, lithium-containing salt includes $Li_2SiO_3$, $Li_2CO_3$ and so on. Preferably, the content of the lithium-containing compound in the internal electrode paste layer is set so that the content of lithium in the lithium-containing compound lies between 0.005 and 1 part by weight inclusive to 100 parts by weight of the metallic element in the conductive material. The same effect can be achieved even if the content of the lithium-containing compound is lower than the content of the carbon compound. However, a lower content of lithium than this range can hardly achieve the effect of addition of the lithium-containing compound, and a higher content of lithium than this range causes the emergence of a segregation phase of the lithium compound and thus causes a sharp decrease in a capacity. More preferably, the content of the lithium-containing compound is set so that the content of lithium in the lithium-containing compound lies between 0.01 and 5 parts by weight inclusive to 100 parts by weight of the metallic element in the conductive material, or still more preferably, 0.02 and 3 parts by weight inclusive.

The terminal electrodes 21 and 22 are each formed by baking a conductive paste composition, for example. For instance, the conductive paste composition contains a conductive material, glass frit and a vehicle. For example, the conductive material comprises at least one element in a group consisting of silver (Ag), gold (Au), copper, nickel, palladium and platinum. For example, each of the plated layers 23 and 24 has a single-layer structure of nickel or tin, or a stacked structure of nickel and tin.

The multilayer capacitor having the above-described configuration can be manufactured in the following manner, for example.

Firstly, a dielectric material is kneaded with an organic vehicle so as to make a dielectric paste for forming the dielectric layers 11a and 11b. A method of manufacturing the dielectric material is not particularly limited. Next, a conductive material and an organic vehicle are kneaded with at least one of a carbon compound and a lithium-containing compound so as to make an internal electrode paste for forming the internal electrodes 12.

Subsequently, a green chip that is a precursor of the capacitor element 10 is made by, for example, print method or sheet method using the dielectric paste and the internal electrode paste. For example, when sheet method is used, the green chip is made in the following manner: first, a dielectric paste layer (a dielectric green sheet) is formed by using the dielectric paste, then an internal electrode paste layer is printed on the dielectric paste layer, then these paste layers are repeatedly alternately stacked, then a resultant stack is thermo compression bonded to a substrate, then the substrate with the stack is cut into a chip having a predetermined shape, then the chip is peeled off from the substrate, and thus the green chip is obtained.

A de-binding process takes place after making the green chip. General conditions can be used for the de-binding process. For example, when a base metal such as nickel or a nickel alloy is used as the internal electrodes 12, the conditions for the de-binding process are adjusted in the following manner.

CONDITIONS FOR DE-BINDING PROCESS

| A rate of temperature rise: | 5° C./h to 300° C./h, or preferably 10° C./h to 100° C./h |
|---|---|
| A holding temperature: | 200° C. to 400° C. |
| A holding time: | 0.5 hour to 24 hours, or preferably 5 hours to 20 hours |
| An atmosphere: | in the air |

After the de-binding process, firing takes place so as to form the capacitor element 10. An atmosphere for firing can be appropriately selected according to a material of the internal electrodes 12. When a base metal such as nickel or a nickel alloy is used as the internal electrodes 12, an atmosphere containing a mixed gas of a nitrogen gas serving as a main component, 1 to 10 vol % of hydrogen gas, and a vapor gas obtained under a vapor pressure at 10 degrees to 35 degrees is preferable. Preferably, a partial pressure of oxygen is from $1\times10^{-3}$ Pa to $1\times10^{-8}$ Pa inclusive. When the partial pressure of oxygen is below this range, the internal electrodes 12 may be abnormally sintered and thus break. When the partial pressure of oxygen exceeds this range, the internal electrodes 12 are prone to oxidation. Preferably, a holding temperature for firing is from 1000 degrees to 1400 degrees inclusive. Densification is insufficient when the holding temperature is below this range, and the internal electrodes 12 are prone to break when the holding temperature exceeds this range. Preferably, a holding time for firing is from 0.5 hour to 8 hours inclusive, or more preferably, the holding time is from 1 hour to 3 hours inclusive.

In the embodiment, at least one of a carbon compound and a lithium-containing compound is added to the internal electrode paste, so that the capacitor element 10 can be inhibited from expanding in the stacking direction or the width direction.

When firing takes place in a reducing atmosphere, it is preferable that, for example, annealing take place after firing. Preferably, a partial pressure of oxygen in an annealing atmosphere is $1\times10^{-6}$ Pa or more, or more preferably, the partial pressure of oxygen is from 0.1 Pa to $1\times10^{-3}$ Pa inclusive. When the partial pressure of oxygen is below this range, it is difficult to re-oxidize the dielectric layers 11a and 11b. When the partial pressure of oxygen exceeds this range, the internal electrodes 12 oxidize. Preferably, a holding temperature for annealing is 1100 degrees or lower, and a holding time is 20 hours or shorter. The holding time is not necessarily required, and thus a step of annealing may comprise only a step of raising a temperature and a step of lowering a temperature. In this case, the holding temperature is synonymous with the maximum temperature. Preferably, a nitrogen gas and humidified hydrogen are used as an atmospheric gas.

In the above-mentioned steps of de-binding, firing and annealing, for example, a gas can be passed through water to humidify a nitrogen gas, a hydrogen gas, a mixed gas of a nitrogen gas and a hydrogen gas, or the like. In this case, it is preferable that a water temperature be about 0 to 75 degrees.

After forming the capacitor element 10, the capacitor element 10 is coated with a conductive paste composition in order to form the terminal electrodes 21 and 22. A method of coating is not particularly limited, and dipping or the like can be used. The amount of coating of the conductive paste composition is not particularly limited but can be appropriately controlled according to a size of the capacitor element 10 to be coated or the like, and, in general, the amount of coating is equivalent to a thickness of about 5 $\mu$m to 100 $\mu$m. After coating the capacitor element 10 with the conductive paste composition, the conductive paste composition is dried. Preferably, drying takes place for about 10 minutes to 1 hour at about 60 to 150 degrees, for example.

After the capacitor element 10 is coated with the conductive paste composition, which is then dried, the capacitor element 10 is baked so as to form the terminal electrodes 21 and 22. Preferably, conditions for baking are that, for example, baking takes place by holding the capacitor element 10 for about 0 to 1 hour at 600 to 1000 degrees in a neutral atmosphere of a nitrogen gas, a reducing atmosphere of a mixed gas of a nitrogen gas and a hydrogen gas or the like, or the air.

After forming the terminal electrodes 21 and 22, the plated layers 23 and 24 are formed on the terminal electrodes 21 and 22, respectively. Either of electroplating and electroless plating can be used, and preferably, the hithertoknown electroplating is used in order to provide good adhesion between the terminal electrodes 21 and 22 and the plated layers 23 and 24. Thus, the multilayer capacitor shown in FIG. 1 is obtained.

As described above, according to the multilayer capacitor of the embodiment, the expansion coefficient x of the capacitor element 10 in the stacking direction lies between −0.05×i (%) and 0.05×i (%) inclusive or between −10 (%) and 0 (%) inclusive, or the expansion coefficient y of the capacitor element 10 in the width direction lies between −0.05×i (%) and 0 (%) inclusive, so that the occurrence of cracks can be inhibited, and therefore a fraction defective can be reduced.

In particular, when the expansion coefficient x lies between −0.05 (%) and 0 (%) inclusive, the occurrence of corner crack can be more effectively inhibited.

Moreover, when the thickness of the dielectric layer 11a located in the outermost portion is equal to or less than 100 μm or is equal to or less than 50 μm, the occurrence of cracks can be more effectively inhibited.

Furthermore, when the capacitor element 10 is formed by stacking and firing the dielectric paste layer and the internal electrode paste layer and the internal electrode paste layer comprises at least one of the carbon compound and the lithium-containing compound, the capacitor element 10 can be prevented from expanding in the stacking direction during firing. Moreover, when the internal electrode paste layer comprises the lithium-containing compound, the capacitor element 10 can be prevented from expanding in the width direction during firing.

Additionally, when the carbon compound is contained so that the content of carbon in the carbon compound lies between 0.5 and 16 parts by weight inclusive to 100 parts by weight of the metallic element in the conductive material, the expansion coefficient x can fall within a predetermined range. Moreover, when the lithium-containing compound is contained so that the content of lithium in the lithium-containing compound lies between 0.005 and 10 parts by weight inclusive to 100 parts by weight of the metallic element in the conductive material, the expansion coefficient x and the expansion coefficient y can fall within the respective predetermined ranges.

Furthermore, specific examples of the invention will be described with reference to FIG. 1.

EXAMPLES 1 TO 6

As examples 1 to 6, first, barium titanate powders having an average particle diameter of 0.4 μm were prepared as a main component material of a dielectric material. The atomic ratio Ba/Ti of barium to titanium in barium titanate was 1.04. Then, 0.2 wt. % of manganese carbonate powders, 0.22 wt. % of yttrium oxide ($Y_2O_3$) powders, 0.03 wt. % of vanadium oxide ($V_2O_5$) powders and 0.038 wt. % of tungsten oxide ($WO_3$) powders were added to the main component material so as to serve as secondary component materials of the dielectric material. Then, these materials were blended by means of a ball mill in the water, then a resultant blend was dried, and thereafter, acrylic resin for serving as an organic binder and methylene chloride and acetone for serving as an organic solvent were added to and blended with the grained and calcined powders, whereby a dielectric paste was made. After making the dielectric paste, a dielectric paste layer was made by means of doctor blade method.

Next, nickel powders having an average particle diameter of 0.4 μm as a conductive material and carbon black powders having an average particle diameter of 0.2 μm as a carbon compound were prepared, then ethyl cellulose for serving as an organic binder and terpineol for serving as an organic solvent were added to these powders, and then the added ethyl cellulose and terpineol were kneaded with the powders by use of a three-roll mill, whereby an internal electrode paste was made. In the examples 1 to 6, the amount of carbon black to be added was changed so that the ratio of carbon to 100 parts by weight of nickel might be as shown in Table 1.

After making the internal electrode paste, an internal electrode paste layer was printed on the dielectric paste layer, then these paste layers were stacked so that the ends of the internal electrode paste layers might be alternately exposed to the outside on the ends of the dielectric paste layers, and then the layers were thermo compression bonded. In this case, the dielectric paste layer was located in the outermost portion in the stacking direction. The number of dielectric paste layers, each of which was sandwiched between the internal electrode paste layers, was equal to 100, and the number i of dielectric layers 11b was equal to 100 after firing. After that, a resultant stack was cut into a green chip so that the fired chip might have dimensions of 3.2 mm long, 1.6 mm wide and 1.0 mm thick (the C3216 type in conformity with the JIS (Japanese Industrial Standards)).

After making the green chip, the green chip was subjected to de-binding, the green chip was held for 2 hours at 1245 degrees in an atmosphere of a mixed gas of humidified nitrogen and hydrogen gases, and the green chip was fired. In this case, the percentage of content of the hydrogen gas in the mixed gas was 5 vol %. After that, the green chip was held for 3 hours at 1000 degrees in a humidified atmosphere having a partial pressure of oxygen of $1 \times 10^{-2}$ Pa, and the green chip was subjected to annealing. Thus, the capacitor elements 10 each comprising the dielectric layers 11a each having a thickness of about 220 μm, the dielectric layers 11b each having a thickness of about 6 μm and the internal electrodes 12 each having a thickness of about 1.5 μm, in which the number i of dielectric layers 11b was equal to 100, were made.

Figure 3:
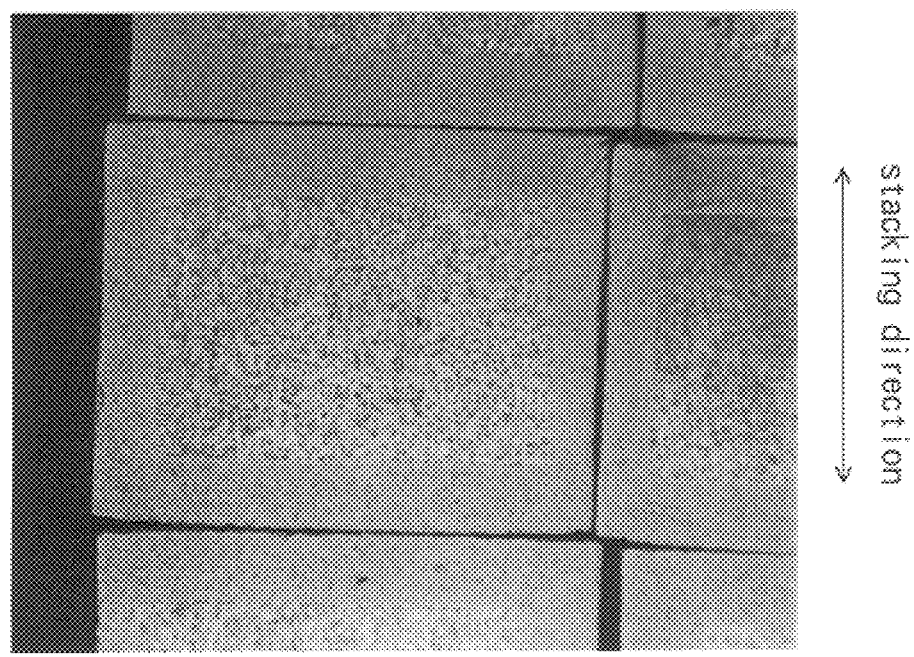
FIG. 3 shows a microscope photograph of a sectional structure of a capacitor element of a multilayer capacitor according to an example 3 of the invention.

Each of the obtained capacitor elements 10 was observed so as to check the expansion coefficient x of each capacitor element 10 in the stacking direction and the fraction defective due to cracking of each capacitor element 10. After that, the end of each capacitor element 10 was coated with an alloy of indium and gallium so as to form the terminal electrodes 21 and 22, and then electrical characteristics (a dielectric constant $\epsilon_r$ and a dielectric loss tan δ) of each capacitor element 10 were measured. The number of samples was equal to 30 for each of the examples, and the respective mean values of the expansion coefficients x, the dielectric constants $\epsilon_r$ and the dielectric losses tan δ of the samples were calculated. The results of calculations are shown in Table 1. FIG. 3 shows a microscope photograph of a sectional structure of the capacitor element 10 according to the example 3. FIG. 3 shows the sectional structure in the direction perpendicular to the directions in which the internal electrodes 12 extend.

Figure 4:
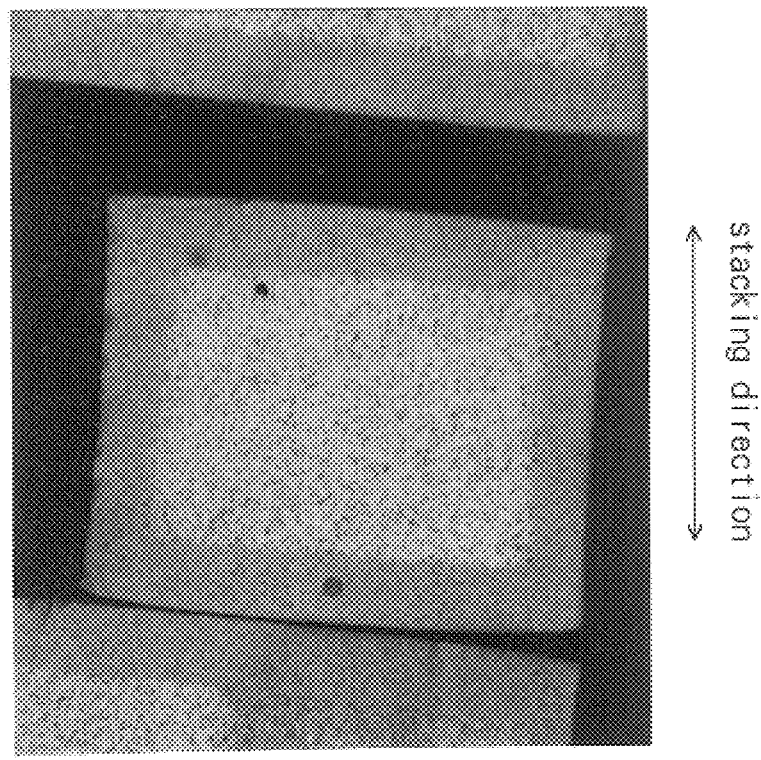
FIG. 4 shows a microscope photograph of a sectional structure of a capacitor element of a multilayer capacitor according to a comparison 1.

As comparisons 1 and 2 to the examples 1 to 6, capacitor elements were formed in the same manner as the examples 1 to 6, except that the amount of carbon black to be added was changed so that the ratio of carbon to 100 parts by weight of nickel might be as shown in Table 1. The electrical characteristics and so on of the comparisons 1 and 2 were measured in the same manner as those of the examples 1 to 6, that is, the expansion coefficient x of each comparison in the stacking direction, the fraction defective due to cracking thereof, the dielectric constant $\epsilon_r$ thereof and the dielectric loss tan δ thereof were measured. The results of measurements are also shown in Table 1. FIG. 4 shows a microscope photograph of a sectional structure of the capacitor element according to the comparison 1. Similarly to FIG. 3, FIG. 4 shows the sectional structure in the direction perpendicular to the directions in which the internal electrodes extend.

As can be seen from Table 1, the expansion coefficients x of the capacitor elements 10 of the examples 1 to 6 in the stacking direction lay between −5 (%) and 5 (%) inclusive, which were equal to −0.05×i and 0.05×i, respectively, and the examples 1 to 6 had lower fraction defectives due to cracking, as compared to the comparisons 1 and 2 having the expansion coefficients x outside the above-mentioned range. In other words, it is found that, when the expansion coefficient x of the capacitor element 10 in the stacking direction lies between −0.05×i (%) and 0.05×i (%) inclusive, the occurrence of cracks can be inhibited and thus the fraction defective can be reduced.

Moreover, it is found that the addition of the carbon compound to the internal electrode paste allows reducing the expansion coefficient x in the stacking direction, and it is found that, in particular when the carbon compound is added to the internal electrode paste so that the content of carbon in the carbon compound lies between 0.5 and 16 parts by weight inclusive to 100 parts by weight of the metallic element in the conductive material, the expansion coefficient x in the stacking direction can lie between −0.05×i (%) and 0.05×i (%) inclusive. Furthermore, it is found that, when the carbon compound is added to the internal electrode paste so that the content of carbon lies between 2 and 12 parts by weight inclusive to 100 parts by weight of the metallic element in the conductive material, the expansion coefficient x in the stacking direction can be closer to zero and thus the fraction defective due to cracking can be further reduced. Additionally, it is found that, when the carbon compound is added to the internal electrode paste so that the content of carbon lies between 4 and 10 parts by weight inclusive to 100 parts by weight of the metallic element in the conductive material, the expansion coefficient x in the stacking direction can be still closer to zero and also the dielectric constant $\epsilon_r$ can be increased.

Incidentally, it can be also seen from FIGS. 3 and 4 that the addition of the carbon compound to the internal electrode paste allows bringing the expansion coefficient x in the stacking direction close to zero.

EXAMPLES 7 TO 11

As examples 7 to 11, the capacitor elements 10 each comprising the dielectric layers 11a each having a thickness of about 210 μm, the dielectric layers 11b each having a thickness of about 5 μm and the internal electrodes 12 each having a thickness of about 1.5 μm, in which the number i of dielectric layers 11b was equal to 100, were made in the same manner as the examples 1 to 6, except that, when making an internal electrode paste, $Li_2SiO_3$ powders serving as lithium-containing salt and having an average particle diameter of 0.2 μm, instead of the carbon compound, were added to the internal electrode paste and that a temperature for firing the capacitor element 10 was 1200 degrees. The amount of lithium-containing salt to be added was changed so that the ratio of lithium to 100 parts by weight of nickel might be as shown in Table 2.

The electrical characteristics and so on of the obtained capacitor elements 10 were measured in the same manner as those of the examples 1 to 6, that is, the expansion coefficient x of each capacitor element 10 in the stacking direction, the expansion coefficient y thereof in the width direction, the fraction defective due to cracking thereof, the dielectric constant $\epsilon_r$ thereof and the dielectric loss tan δ thereof were measured. The results of measurements are shown in Table 2.

As comparisons 3 and 4 to the examples 7 to 11, capacitor elements were formed in the same manner as the examples 7 to 11, except that the amount of lithium-containing salt to be added was changed so that the ratio of lithium to 100 parts by weight of nickel might be as shown in Table 2. The electrical characteristics and so on of the comparisons 3 and 4 were measured in the same manner as those of the examples 7 to 11, that is, the expansion coefficient x of each comparison in the stacking direction, the expansion coefficient y thereof in the width direction, the fraction defective due to cracking thereof, the dielectric constant $\epsilon_r$ thereof and the dielectric loss tanδ thereof were measured. The results of measurements are also shown in Table 2.

As can be seen from Table 2, the expansion coefficients x of the capacitor elements 10 of the examples 7 to 11 in the stacking direction lay between −5 (%) and 5 (%) inclusive, which were equal to −0.05×i and 0.05×i, respectively, the expansion coefficients y thereof in the width direction lay between −5 (%) equal to −0.05×i and 0 (%) inclusive, and the examples 7 to 11 had lower fraction defectives due to cracking, as compared to the comparisons 3 and 4 having the expansion coefficients x and y outside the above-mentioned ranges. In other words, it is found that, when the expansion coefficient x of the capacitor element 10 in the stacking direction lies between −0.05×i (%) and 0.05×i (%) inclusive and the expansion coefficient y thereof in the width direction lies between −0.05×i (%) and 0 (%) inclusive, the occurrence of cracks can be inhibited and thus the fraction defective can be reduced.

Moreover, it is found that the addition of the lithium-containing salt to the internal electrode paste allows reducing the expansion coefficient x in the stacking direction and the expansion coefficient y in the width direction, and it is found that, in particular when the lithium-containing salt is added to the internal electrode paste so that the content of lithium in the lithium-containing salt lies between 0.005 and 10 parts by weight inclusive to 100 parts by weight of the metallic element in the conductive material, the expansion coefficient x in the stacking direction can lie between −0.05×i (%) and 0.05×i (%) inclusive and the expansion coefficient y in the width direction can lie between −0.05×i (%) and 0 (%) inclusive. Furthermore, it is found that, when the lithium-containing salt is added to the internal electrode paste so that the content of lithium lies between 0.01 and 5 parts by weight inclusive to 100 parts by weight of the metallic element in the conductive material, the fraction defective due to cracking can be further reduced. Additionally, it is found that, when the lithium-containing salt is added to the internal electrode paste so that the content of lithium lies between 0.02 and 3 parts by weight inclusive to 100 parts by weight of the metallic element in the conductive material, the fraction defective due to cracking can be reduced and also the dielectric constant $\epsilon_r$ can be increased.

EXAMPLES 12 TO 16

As examples 12 to 16, the capacitor elements 10 were made in the same manner as the examples 7 to 11, except that the dielectric layer 11a had a thickness of about 200 μm, the dielectric layer 11b had a thickness of about 5 μm, the internal electrode 12 had a thickness of about 1.5 µm and the number i of dielectric layers 11b was equal to 300. As in the case of the examples 7 to 11, the amount of lithium-containing salt to be added was changed so that the ratio of lithium to 100 parts by weight of nickel might be as shown in Table 3.

Figure 5:
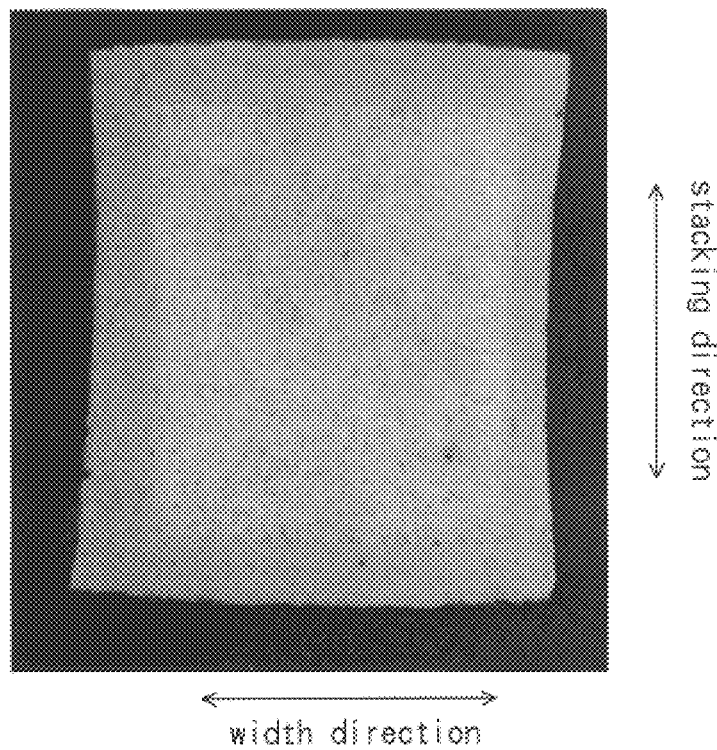
FIG. 5 shows a microscope photograph of a sectional structure of a capacitor element of a multilayer capacitor according to an example 15 of the invention.

The electrical characteristics and so on of the obtained capacitor elements 10 were measured in the same manner as those of the examples 1 to 6, that is, the expansion coefficient x of each capacitor element 10 in the stacking direction, the expansion coefficient y thereof in the width direction, the fraction defective due to cracking thereof, the dielectric constant $\epsilon_r$ thereof and the dielectric loss tan δ thereof were measured. The results of measurements are shown in Table 3. FIG. 5 shows a microscope photograph of a sectional structure of the capacitor element 10 according to the example 15. Similarly to FIG. 3, FIG. 5 shows the sectional structure in the direction perpendicular to the directions in which the internal electrodes 12 extend.

Figure 6:
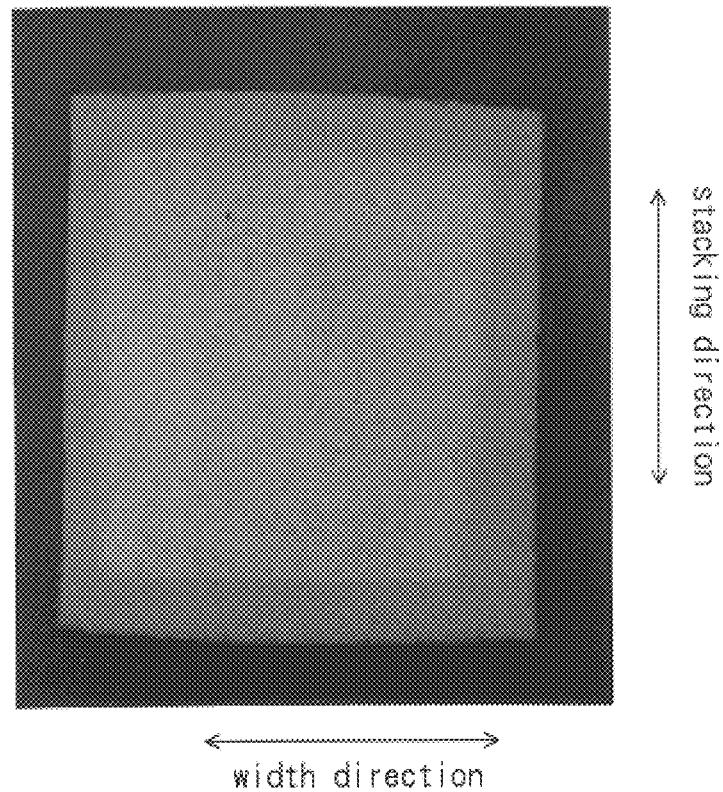
FIG. 6 shows a microscope photograph of a sectional structure of a capacitor element of a multilayer capacitor according to a comparison 5.

As comparisons 5 and 6 to the examples 12 to 16, capacitor elements were formed in the same manner as the examples 12 to 16, except that the amount of lithium-containing salt to be added was changed so that the ratio of lithium to 100 parts by weight of nickel might be as shown in Table 2. The electrical characteristics and so on of the comparisons 5 and 6 were measured in the same manner as those of the examples 12 to 16, that is, the expansion coefficient y of each comparison in the width direction, the fraction defective due to cracking thereof, the dielectric constant $\epsilon_r$ thereof and the dielectric loss tan δ thereof were measured. The results of measurements are also shown in Table 3. FIG. 6 shows a microscope photograph of a sectional structure of the capacitor element according to the comparison 5. Similarly to FIG. 3, FIG. 6 shows the sectional structure in the direction perpendicular to the directions in which the internal electrodes extend.

As can be seen from Table 3, the expansion coefficients y of the capacitor elements 10 of the examples 12 to 16 in the width direction lay between −15 (%) equal to −0.05×i and 0 (%) inclusive, and the examples 12 to 16 had lower fraction defectives due to cracking, as compared to the comparisons 5 and 6 having the expansion coefficients y outside the above-mentioned range. In other words, it is found that, when the expansion coefficient y of the capacitor element 10 in the width direction lies between −0.05×i (%) and 0 (%) inclusive, the occurrence of cracks can be inhibited and thus the fraction defective can be reduced, similarly to the examples 7 to 11.

Moreover, similarly to the examples 7 to 11, it is found that the addition of the lithium-containing salt to the internal electrode paste allows reducing the expansion coefficient x in the stacking direction and the expansion coefficient y in the width direction, and it is found that, when the lithium-containing salt is added to the internal electrode paste so that the content of lithium in the lithium-containing salt lies between 0.005 and 10 parts by weight inclusive to 100 parts by weight of the metallic element in the conductive material, the expansion coefficient x in the stacking direction can lie between −0.05×i (%) and 0.05×i (%) inclusive and the expansion coefficient y in the width direction can lie between −0.05×i (%) and 0 (%) inclusive. Furthermore, it is found that, when the lithium-containing salt is added to the internal electrode paste so that the content of lithium lies between 0.01 and 5 parts by weight inclusive to 100 parts by weight of the metallic element in the conductive material, the fraction defective due to cracking can be reduced and also the dielectric constant $\epsilon_r$ can be increased. Additionally, it is found that, when the lithium-containing salt is added to the internal electrode paste so that the content of lithium lies between 0.02 and 3 parts by weight inclusive to 100 parts by weight of the metallic element in the conductive material, the dielectric constant $\epsilon_r$ can be further increased.

Incidentally, it can be also seen from FIGS. 5 and 6 that the addition of the lithium-containing salt to the internal electrode paste allows reducing the expansion coefficient y in the width direction.

EXAMPLES 17 TO 22

As examples 17 to 22, the capacitor elements 10 were made in the same manner as the example 14, except that the dielectric layer 11a had varying thicknesses as shown in Table 4. The dielectric layer 11b had a thickness of about 5 µm, the internal electrode 12 had a thickness of about 1.5 µm, the number i of dielectric layers 11b was equal to 300, and the amount of lithium-containing salt to be added was set so that the content of lithium might be 2 parts by weight to 100 parts by weight of nickel. The electrical characteristics and so on of the obtained capacitor elements 10 were measured in the same manner as those of the example 14, that is, the expansion coefficient x of each capacitor element 10 in the stacking direction, the expansion coefficient y thereof in the width direction, the fraction defective due to cracking thereof, the dielectric constant $\epsilon_r$ thereof and the dielectric loss tan δ thereof were measured. The results of measurements are shown in Table 4 in conjunction with the results of the example 14.

As can be seen from Table 4, a thinner dielectric layer 11a yielded a lower expansion coefficient x in the stacking direction and also a lower fraction defective due to cracking. It is found that, in particular when the dielectric layer 11a has a thickness of 100 µm or less and the expansion coefficient x in the stacking direction is 0 (%) or less, the fraction defective due to cracking can be reduced to 5% or less, which is very low, and furthermore it is found that, when the dielectric layer 11a has a thickness of 50 µm or less, the fraction defective due to cracking can be reduced to 3% or less.

EXAMPLES 23 TO 26

As examples 23 to 26, the capacitor elements 10 were made in the same manner as the example 20, except that the amount of lithium-containing salt to be added was changed so that the ratio of lithium to 100 parts by weight of nickel might be as shown in Table 5. The dielectric layer 11a had a thickness of about 50 µm, the dielectric layer 11b had a thickness of about 5 µm, the internal electrode 12 had a thickness of about 1.5 µm, and the number i of dielectric layers 11b was equal to 300. The electrical characteristics and so on of the obtained capacitor elements 10 were measured in the same manner as those of the example 20, that is, the expansion coefficient x of each capacitor element 10 in the stacking direction, the expansion coefficient y thereof in the width direction, the fraction defective due to cracking thereof, the dielectric constant $\epsilon_r$ thereof and the dielectric loss tan δ thereof were measured. The results of measurements are shown in Table 5 in conjunction with the results of the example 20.

As can be seen from Table 5, a larger amount of added lithium-containing salt yielded a lower expansion coefficient x in the stacking direction and also a lower fraction defective due to corner crack. However, when too large an amount of added lithium-containing salt caused an expansion coefficient x of less than −10% in the stacking direction, the fraction defective due to cracking resulting from delamination increased. In other words, it is found that, particularly in the case where the number i of dielectric layers 11b is great, the expansion coefficient x in the stacking direction is caused to lie between −10 (%) and 0 (%) inclusive, whereby the fraction defective due to cracking can be further reduced.

In the above-mentioned examples, the description is given with regard to the case where carbon black for serving as the carbon compound is added to the internal electrode paste and the case where $Li_2SiO_3$ for serving as the lithium-containing compound is added to the internal electrode paste, but the same results can be obtained by the addition of other carbon compounds or other lithium-containing compounds. Alternatively, the same results can be obtained by the addition of both the carbon compound and the lithium-containing compound.

Furthermore, in the above-mentioned examples, the description is given with regard to the case where nickel is used as the conductive material in the internal electrode paste, but the same results can be obtained by use of other conductive materials. In addition, the same results can be obtained, even if the conductive material contains various types of trace components or contains a material having the same composition as the composition of the dielectric layer or a component in the composition of the dielectric.

Although the invention has been described above by referring to the embodiment and the examples, the invention is not limited to the above-mentioned embodiment and examples and various modifications of the invention are possible. For example, in the above-mentioned embodiment and examples, at least one of the carbon compound and the lithium-containing compound is added to the internal electrode paste layer so that the expansion coefficient x of the capacitor element 10 in the stacking direction or the expansion coefficient y of the capacitor element 10 in the width direction falls within a predetermined range, but the expansion coefficients x and y may be controlled by other means. For example, the internal electrode paste layer may comprise a bismuth-containing compound or a zinc-containing compound that evaporates at low temperature similarly to the carbon compound or the lithium-containing compound, or the like.

In the above-mentioned embodiment, the description is given with regard to the case where the expansion coefficient x of the capacitor element 10 in the stacking direction and the expansion coefficient y of the capacitor element 10 in the width direction fall within the respective predetermined ranges, but either the expansion coefficient x in the stacking direction or the expansion coefficient y in the width direction may fall within a predetermined range.

In the above-mentioned embodiment and examples, the description is given with regard to the case where the plated layers 23 and 24 are provided, but the invention can be applied to a multilayer capacitor including no plated layer, as well as the multilayer capacitor including the plated layers.

As described above, according to the multilayer capacitor of the invention, the expansion coefficient x of the capacitor element in the stacking direction lies between −0.05×i (%) and 0.05×i (%) inclusive, where i denotes the number of dielectric layers, the expansion coefficient x in the stacking direction lies between −10 (%) and 0 (%) inclusive, or the expansion coefficient y of the capacitor element in the width direction lies between −0.05×i (%) and 0 (%) inclusive, so that the effects such that the occurrence of cracks can be inhibited, and therefore the fraction defective can be reduced are obtained.

According to the multilayer capacitor of one aspect of the invention, the expansion coefficient x in the stacking direction lies between −0.05i (%) and 0 (%) inclusive, or the dielectric layer located in the outermost portion in the stacking direction has a thickness of 100 μm or less, so that the effects such that the occurrence of cracks can be further inhibited, and therefore the fraction defective can be further reduced are obtained.

According to the multilayer capacitor of another aspect of the invention, the capacitor element is formed by stacking and firing the dielectric paste layer and the internal electrode paste layer, and the internal electrode paste layer comprises at least one of the carbon compound and the lithium-containing compound, so that the effects such that the capacitor element can be prevented from expanding in the stacking direction during firing, and thus the multilayer capacitor of the invention can be obtained are achieved.

According to the multilayer capacitor of still another aspect of the invention, the internal electrode paste layer contains the carbon compound in such a manner that the content of carbon lies between 0.5 and 16 parts by weight inclusive to 100 parts by weight of the metallic element in the conductive material, or the internal electrode paste layer contains the lithium-containing compound in such a manner that the content of lithium lies between 0.005 and 10 parts by weight inclusive to 100 parts by weight of the metallic element in the conductive material, so that an effect such that the expansion coefficient x in the stacking direction can lie between −0.05×i (%) and 0.05×i (%) inclusive is obtained.

According to the multilayer capacitor of a further aspect of the invention, the capacitor element is formed by stacking and firing the dielectric paste layer and the internal electrode paste layer, and the internal electrode paste layer comprises the lithium-containing compound, so that the effects such that the capacitor element can be prevented from expanding in the width direction during firing, and thus the multilayer capacitor of the invention can be obtained are achieved.

According to the multilayer capacitor of a further aspect of the invention, the internal electrode paste layer contains the lithium-containing compound in such a manner that the content of lithium lies between 0.005 and 10 parts by weight inclusive to 100 parts by weight of the metallic element in the conductive material, so that an effect such that the expansion coefficient y in the width direction can lie between −0.05×i (%) and 0 (%) inclusive is obtained.

Obviously many modifications and variations of the invention are possible in the light of the above teachings. It is therefore to be understood that within the scope of the appended claims the invention may be practiced otherwise than as specifically described.

TABLE 1

|  |  | Ratio of C to Ni (Part by weight) | Expansion coefficient x in stacking direction (%) | Fraction defective due to cracking (%) | |
|---|---|---|---|---|---|
|  |  |  |  | Corner crack | Delamination |
| Example | 1 | 0.5 | 5.0 | 10 | 0 |
|  | 2 | 2 | 4.5 | 0 | 0 |
|  | 3 | 4 | 2.6 | 0 | 0 |
|  | 4 | 8 | 0.8 | 0 | 0 |
|  | 5 | 12 | −1.5 | 0 | 0 |
|  | 6 | 16 | −4.1 | 0 | 10 |

TABLE 1-continued

| | | | | | |
|---|---|---|---|---|---|
| Comparison | 1 | 0 | 8 | 47 | 0 |
| | 2 | 20 | −6.3 | 0 | 100 |

| | | Dielectric constant $\epsilon_r$ | Dielectric loss tan δ (%) | Number i of dielectric layers | Thickness of dielectric layer 11a (μm) |
|---|---|---|---|---|---|
| Example | 1 | 9600 | 6.0 | 100 | 220 |
| | 2 | 9759 | 7.2 | 100 | 220 |
| | 3 | 10123 | 7.1 | 100 | 220 |
| | 4 | 8912 | 7.1 | 100 | 220 |
| | 5 | 8560 | 7.1 | 100 | 220 |
| | 6 | 2000 | 5 | 100 | 220 |
| Comparison | 1 | 9550 | 5.7 | 100 | 220 |
| | 2 | 83 | 0.8 | 100 | 220 |

TABLE 2

| | | Ratio of Li to Ni (Part by weight) | Expansion coefficient x in stacking direction (%) | Expansion coefficient y in width direction (%) | Fraction defective due to cracking (%) | |
|---|---|---|---|---|---|---|
| | | | | | Corner crack | Delamination |
| Example | 7 | 0.005 | 4.5 | −1.1 | 8 | 0 |
| | 8 | 0.05 | 3.9 | −1.5 | 0 | 0 |
| | 9 | 2 | 3.0 | −2.0 | 0 | 0 |
| | 10 | 4 | 1.2 | −4.8 | 0 | 0 |
| | 11 | 10 | −2.6 | −4.9 | 0 | 10 |
| Comparison | 3 | 0 | 8 | 1.0 | 47 | 0 |
| | 4 | 16 | −6.0 | −11.5 | 0 | 80 |

| | | Dielectric constant $\epsilon_r$ | Dielectric loss tan δ (%) | Number i of dielectric layers | Thickness of dielectric layer 11a (μm) |
|---|---|---|---|---|---|
| Example | 7 | 9540 | 5.7 | 100 | 210 |
| | 8 | 9520 | 5.7 | 100 | 210 |
| | 9 | 9500 | 5.8 | 100 | 210 |
| | 10 | 8500 | 6.2 | 100 | 210 |
| | 11 | 7200 | 8.3 | 100 | 210 |
| Comparison | 3 | 9550 | 5.7 | 100 | 210 |
| | 4 | 4820 | 8.3 | 100 | 210 |

TABLE 3

| | | Ratio of Li to Ni (Part by weight) | Expansion coefficient x in stacking direction (%) | Expansion coefficient y in width direction (%) | Fraction defective due to cracking (%) | |
|---|---|---|---|---|---|---|
| | | | | | Corner crack | Delamination |
| Example | 12 | 0.005 | 7.8 | −1.4 | 15 | 0 |
| | 13 | 0.05 | 5.6 | −2.6 | 5 | 0 |
| | 14 | 2 | 3.5 | −3.7 | 7 | 0 |
| | 15 | 4 | 2.3 | −6.7 | 10 | 5 |
| | 16 | 10 | 0.8 | −9.7 | 8 | 8 |
| Comparison | 5 | 0 | 9.9 | 2.3 | 53 | 0 |
| | 6 | 16 | −1.5 | −18.2 | 0 | 85 |

| | | Dielectric constant $\epsilon_r$ | Dielectric loss tan δ (%) | Number i of dielectric layers | Thickness of dielectric layer 11a (μm) |
|---|---|---|---|---|---|
| Example | 12 | 9540 | 5.7 | 300 | 200 |
| | 13 | 9520 | 5.7 | 300 | 200 |
| | 14 | 9500 | 5.8 | 300 | 200 |
| | 15 | 8500 | 6.2 | 300 | 200 |
| | 16 | 7200 | 8.3 | 300 | 200 |
| Comparison | 5 | 9550 | 5.7 | 300 | 200 |
| | 6 | 4820 | 8.3 | 300 | 200 |

TABLE 4

| | | Ratio of Li to Ni (Part by weight) | Expansion coefficient x in stacking direction (%) | Expansion coefficient y in width direction (%) | Fraction defective due to cracking (%) | |
|---|---|---|---|---|---|---|
| | | | | | Corner crack | Delamination |
| Example | 17 | 2 | 3.2 | −3.1 | 24 | 0 |
| | 18 | 2 | 1.8 | −3.5 | 18 | 0 |
| | 14 | 2 | 3.5 | −3.7 | 7 | 0 |
| | 19 | 2 | −1.5 | −3.7 | 5 | 0 |
| | 20 | 2 | −6.6 | −4 | 2 | 0 |
| | 21 | 2 | −7.8 | −4.3 | 0 | 0 |
| | 22 | 2 | −8.3 | −4 | 0 | 0 |

| | | Dielectric constant $\epsilon_r$ | Dielectric loss tan δ (%) | Number i of dielectric layers | Thickness of dielectric layer 11a (μm) |
|---|---|---|---|---|---|
| Example | 17 | 9500 | 5.8 | 300 | 500 |
| | 18 | 9500 | 5.8 | 300 | 250 |
| | 14 | 9500 | 5.8 | 300 | 200 |
| | 19 | 9500 | 5.8 | 300 | 100 |
| | 20 | 9500 | 5.8 | 300 | 50 |
| | 21 | 9500 | 5.8 | 300 | 20 |
| | 22 | 9500 | 5.8 | 300 | 10 |

TABLE 5

| | | Ratio of Li to Ni (Part by weight) | Expansion coefficient x in stacking direction (%) | Expansion coefficient y in width direction (%) | Fraction defective due to cracking (%) | |
|---|---|---|---|---|---|---|
| | | | | | Corner crack | Delamination |
| Example | 23 | 0.005 | −0.6 | −1.1 | 3 | 0 |
| | 24 | 0.05 | −1.7 | −2.9 | 0 | 0 |
| | 20 | 2 | −6.6 | −4 | 2 | 0 |
| | 25 | 4 | −10.2 | −7.9 | 0 | 0 |
| | 26 | 10 | −12.8 | −10.5 | 0 | 8 |

| | | Dielectric constant $\epsilon_r$ | Dielectric loss tan δ (%) | Number i of dielectric layers | Thickness of dielectric layer 11a (μm) |
|---|---|---|---|---|---|
| Example | 23 | 9540 | 5.7 | 300 | 50 |
| | 24 | 9520 | 5.7 | 300 | 50 |
| | 20 | 9500 | 5.8 | 300 | 50 |
| | 25 | 8500 | 6.1 | 300 | 50 |
| | 26 | 7200 | 5.6 | 300 | 50 |

What is claimed is:

1. A multilayer ceramic capacitor comprising a capacitor element in which dielectric layers made of ceramic and internal electrodes are alternatively stacked, wherein an expansion coefficient x of the capacitor element in a stacking direction lies between −0.05×i (%) and 0.05×i (%) inclusive, where i denotes the number of dielectric layers, each of which is sandwiched between the internal electrodes.

2. The multilayer ceramic capacitor according to claim 1, wherein the expansion coefficient x lies between −0.05×i (%) and 0 (%) inclusive.

3. A multilayer ceramic capacitor comprising a capacitor element in which dielectric layers made of ceramic and internal electrodes are alternately stacked, wherein the expansion coefficient x of the capacitor element in the stacking direction lies between −0.10 (%) and 0 (%) inclusive.

4. The multilayer ceramic capacitor according to claim 1, wherein the capacitor element has the dielectric layer in an outermost portion in the stacking direction, and the dielectric layer located in the outermost portion has a thickness of 100 μm or less.

5. The multilayer ceramic capacitor according to claim 1, wherein the internal electrode includes nickel (Ni).

6. The multilayer ceramic capacitor according to claim 1, wherein the capacitor element is obtained by stacking and firing a dielectric paste layer containing a dielectric material and an internal electrode paste layer containing a conductive material, and the internal electrode paste layer comprises at least one of a carbon compound and a lithium-containing compound.

7. The multilayer ceramic capacitor according to claim 6, wherein the internal electrode paste layer contains the carbon compound in such a manner that the content of carbon (C) in the carbon compound lies between 0.5 and 16 parts by weight inclusive to 100 parts by weight of a metallic element in the conductive material.

8. The multilayer ceramic capacitor according to claim 6, wherein the internal electrode paste layer contains the lithium-containing compound in such a manner that the content of lithium (Li) in the lithium-containing compound lies between 0.005 and 10 parts by weight inclusive to 100 parts by weight of the metallic element in the conductive material.

9. The multilayer ceramic capacitor according to claim 6, wherein the lithium-containing compound is lithium-containing salt.

10. A multilayer ceramic capacitor comprising a capacitor element in which dielectric layers made of ceramic and internal electrodes are alternatively stacked, wherein an expansion coefficient y of the capacitor element in a width direction lies between −0.05×i (%) and 0 (%) inclusive, where i denotes the number of dielectric layers, each of which is sandwiched between the internal electrodes.

11. The multilayer ceramic capacitor according to claim 10, wherein the internal electrode includes nickel (Ni).

12. The multilayer ceramic capacitor according to claim 10, wherein the capacitor element is obtained by stacking and firing a dielectric paste layer containing a dielectric material and an internal electrode paste layer containing a conductive material, and the internal electrode paste layer comprises a lithium-containing compound.

13. The multilayer ceramic capacitor according to claim 12, wherein the internal electrode paste layer contains the lithium-containing compound in such a manner that the content of lithium (Li) in the lithium-containing compound lies between 0.005 and 10 parts by weight inclusive to 100 parts by weight of the metallic element in the conductive material.

14. The multilayer ceramic capacitor according to claim 12, wherein the lithium-containing compound is lithium-containing salt.

* * * * *